B. W. TRAYLOR.
FILTER.
APPLICATION FILED MAY 20, 1911.

1,037,561.

Patented Sept. 3, 1912.

Attest:
Ewd L. Tolson
Edward N. Saxton

Inventor:
Bruce W. Traylor,
by Spear, Middleton, Donaldson & Spear
Atty's.

UNITED STATES PATENT OFFICE.

BRUCE W. TRAYLOR, OF NEW YORK, N. Y.

FILTER.

1,037,561.	Specification of Letters Patent.	Patented Sept. 3, 1912.

Application filed May 20, 1911. Serial No. 628,533.

*To all whom it may concern:*

Be it known that I, BRUCE W. TRAYLOR, citizen of the United States, residing at New York, N. Y., have invented certain new and useful Improvements in Filters, of which the following is a specification.

My present invention relates to improvements in filters of the type employing a plurality of longitudinally movable connected filter pans, and particularly to the means employed for feeding the solution to be filtered to the said pans, the object of the invention being to provide a simple form of apparatus which, while forming an efficient feed, will prevent any waste of the solution.

The invention includes the novel features of construction and combination and arrangement of parts hereinafter described and particularly set forth in the appended claims.

Figure 1:
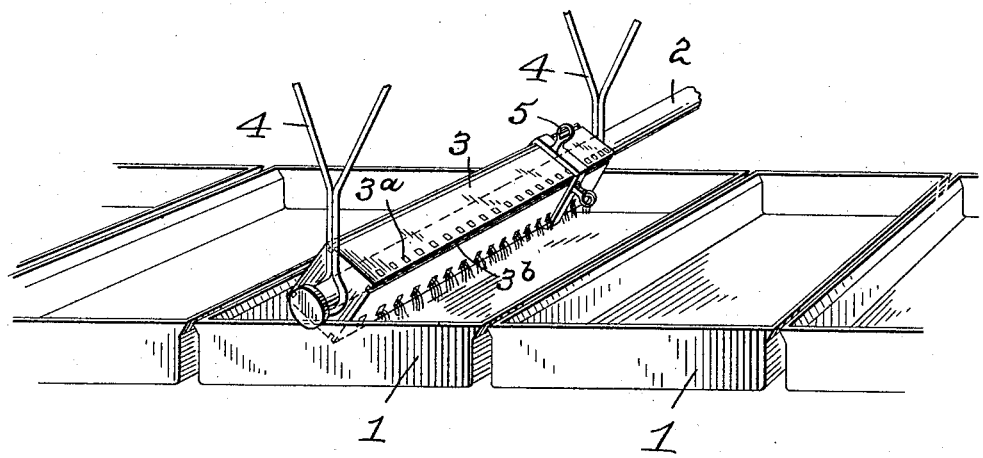
Figure 2:
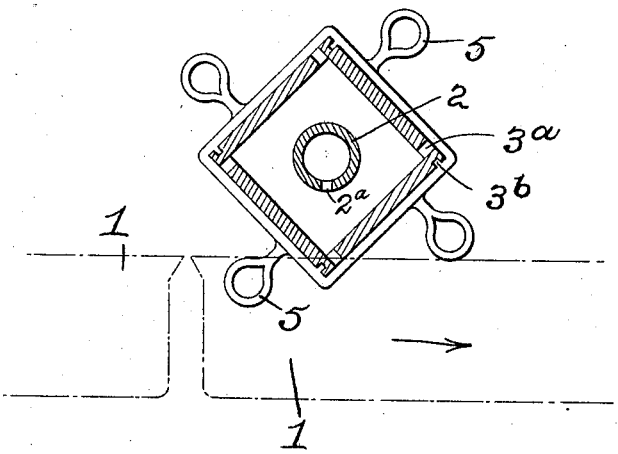

In these drawings Figure 1 is a perspective view of a series of connected filter pans; and Fig. 2 is a sectional detail.

Referring by reference characters to these drawings, the numerals 1, 1, designate a series of filter pans connected together and designed to travel longitudinally, these being representative of the type in which the filters are of an endless chain character traveling over suitable drums or wheels, and which latter it is deemed unnecessary to show in the present drawings, as these form no part of the present invention.

The numeral 2 designates a feed pipe for feeding the solution to be filtered from any suitable source (not shown) having a discharge slot 2ª, and in order to avoid loss or waste of the solution which would take place were the feed a continuous one, at the time the hinge joints between the pans passed beneath the feed device, I provide an intermittently rotating feed which is automatically operated so as to cause the feed to skip or straddle the joints between the adjacent pans. The preferred means of accomplishing this is to provide a rotary box or member 3 which is journaled in suitable hangers 4, and which is provided at suitable intervals around its periphery with rows of perforations or discharge openings, as indicated at 3ª. Projecting at corresponding intervals from the member 3 are contact devices 5 which, as the pans travel along beneath the feed member, are designed to successively contact with the walls of the filter pans. Thus while one filter pan is traveling beneath the feed device, as indicated in Fig. 1, the said feed device or box occupies a position as shown with one row of perforations or feed openings lowermost. As the edge of the filter pan, however, approaches the contact device or tripper and strikes the same, it causes the feed box to rotate or turn approximately ninety degrees, with the result that the said row of feed openings continues to discharge into the corresponding feed pan until the next succeeding row has passed over the edge of the pan, at which time the rotary motion raises the preceding row of feed openings sufficiently high to stop the feed therethrough, which then takes place through the succeeding row and into the succeeding pan. In order to prevent any dripping back of the solution from the sides of the drip pan into the space between the pans as the feed device is rotating, I provide each corner of the feed device with a drip strip, as indicated at 3ᵇ, which strip may be formed by a longitudinal groove adjacent the corner of the feed box.

It will be understood that as the feed device or box rotates the water or solution is liable to stick on until the bottom gets up to a different angle, which would allow the water to run back and drip in between the pans that are traveling under it, but this running back is prevented by the projections from the sides referred to.

Having thus described my invention what I claim is:

1. The combination with a plurality of connected moving filter pans, of a rotary feed member suspended above said pans and having longitudinally arranged feed openings, and means whereby said feed device is rotated on reaching the point of junction of adjacent filter pans, substantially as described.

2. The combination with a plurality of moving filter pans, of a feed supply pipe, a rotary feed device with which said pipe communicates, said feed device having rows of feed openings, and projections carried by said feed pipe designed to contact with parts at the junction of the pans for automatically rotating the feed device, substantially as described.

3. The combination with a plurality of traveling filter pans, of an automatically rotatable feed device having rows of feed openings, and drip preventing devices adjacent said feed openings, substantially as described.

In testimony whereof, I affix my signature in presence of two witnesses.

BRUCE W. TRAYLOR.

Witnesses:
W. J. ROBERTS,
H. J. DRYSDALE.

Copies of this patent may be obtained for five cents each, by addressing the "Commissioner of Patents, Washington, D. C."